(12) United States Patent
Siohan et al.

(10) Patent No.: US 12,199,783 B2
(45) Date of Patent: Jan. 14, 2025

(54) MEETING SPEECH BIASING AND/OR DOCUMENT GENERATION BASED ON MEETING CONTENT AND/OR RELATED DATA

(71) Applicant: GOOGLE LLC, Mountain View, CA (US)

(72) Inventors: Olivier Siohan, New York, NY (US); Takaki Makino, Ridgewood, NJ (US); Joshua Maynez, London (GB); Ryan Mcdonald, London (GB); Benyah Shaparenko, Rego Park, NY (US); Joseph Nelson, Chapel Hill, NC (US); Kishan Sachdeva, San Bruno, CA (US); Basilio Garcia, Secaucus, NJ (US)

(73) Assignee: GOOGLE LLC, Mountain View, CA (US)

( * ) Notice: Subject to any disclaimer, the term of this patent is extended or adjusted under 35 U.S.C. 154(b) by 374 days.

(21) Appl. No.: 17/678,657

(22) Filed: Feb. 23, 2022

(65) Prior Publication Data

US 2023/0267922 A1 Aug. 24, 2023

Related U.S. Application Data

(60) Provisional application No. 63/311,727, filed on Feb. 18, 2022.

(51) Int. Cl.
*H04L 12/18* (2006.01)
*G06F 40/279* (2020.01)
*G10L 15/18* (2013.01)

(52) U.S. Cl.
CPC ........ *H04L 12/1818* (2013.01); *G06F 40/279* (2020.01); *G10L 15/1815* (2013.01); *H04L 12/1831* (2013.01)

(58) Field of Classification Search
None
See application file for complete search history.

(56) References Cited

U.S. PATENT DOCUMENTS

2017/0092264 A1 3/2017 Hakkani-Tur et al.
2018/0101761 A1 4/2018 Nelson
(Continued)

OTHER PUBLICATIONS

European Patent Office; International Search Report and Written Opinion issued in Application PCT/US2022/037321; 15 pages; dated Nov. 11, 2022.

*Primary Examiner* — Antim G Shah
(74) *Attorney, Agent, or Firm* — Gray Ice Higdon

(57) ABSTRACT

Implementations relate to an application that can bias automatic speech recognition for meetings using data that may be associated with the meeting and/or meeting participants. A transcription of inputs provided during a meeting can additionally and/or alternatively be processed to determine whether the inputs should be incorporated into a meeting document, which can provide a summary for the meeting. In some instances, entries into a meeting document can be designated as action items, and those action items can optionally have conditions for reminding meeting participants about the action items and/or for determining whether an action item has been fulfilled. In this way, various tasks that may typically be manually performed by meeting participants, such as creating a meeting summary, can be automated in a more accurate manner. This can preserve resources that may otherwise be wasted during video conferences, in-person meetings, and/or other gatherings.

18 Claims, 10 Drawing Sheets

(56) References Cited

U.S. PATENT DOCUMENTS

2019/0132265 A1     5/2019   Nowak-przygodzki et al.
2020/0403818 A1   12/2020   Daredia
2023/0004713 A1*   1/2023   Broussard ............. G06F 40/216

* cited by examiner

MEETING SPEECH BIASING AND/OR DOCUMENT GENERATION BASED ON MEETING CONTENT AND/OR RELATED DATA

BACKGROUND

The increasing availability of video meeting software has led many users to recognize some shortcomings of the current state of the technology. For example, similar to in-person meetings, video meetings may involve participants discussing a variety of different talking points. Some participants may manually take notes during a meeting, and those notes may be referenced later by certain participants who may be tasked with completing action item(s) identified during the meeting. When participants take notes during the meeting in this way, they may miss out on certain talking points discussed during the meeting, which can result in some action items being addressed inaccurately. Although some applications may function to provide a meeting transcript (e.g., a textual version of most spoken inputs provided during a meeting), such transcripts may not reflect the importance of certain talking points over others (e.g., a "lunch order" discussion versus a discussion of an experiment conducted by a meeting participant). Therefore, relying on some available transcription applications may not provide any additional efficiencies with respect to streamlining the creation of relevant meeting documents and/or action items.

For applications that facilitate speech transcription for meetings, speech recognition may be limited in situations where a variety of subject matters are discussed and/or otherwise referenced during the meeting. For instance, spoken terms and phrases that arise during a meeting may be unique to an organization and/or may have been generated by an organization in a relatively recent time. As a result, common speech recognition applications may not accurately transcribe words and/or phrases recently adopted within a lexicon of a certain industry and/or organization. Therefore, participants of meetings that rely on such transcripts may not be working with accurate transcriptions when attempting to fulfill certain action items from their meetings.

SUMMARY

Implementations set forth herein relate to techniques for automating certain aspects of group meetings involving multiple users. Such aspects can include, for example, note taking and/or biasing automated speech recognition (ASR) based on relevant meeting documents and/or other content to generate notes for a meeting. Such aspects can additionally or alternatively include, for example, generating a meeting summary based on a transcript of the meeting, notes taken by at least one participant during the meeting, visual and/or audio cues captured during a meeting (with prior permission from the participant(s)), and/or express requests from participants, during a meeting, regarding content to include in the summary. Such aspects can further additionally or alternatively include generating action items from a meeting, such that those action items can be linked to certain portions of the summary and/or used to create reminders that can be rendered for certain participants based on conditions that may be determined from meeting content.

In some implementations, ASR can be biased for transcribing spoken content from participants during a meeting in furtherance of more accurately creating notes and/or other content from the meeting. The ASR can be biased using content from documents and/or other files that can be selected by a meeting application and/or other application (e.g., an automated assistant application) based on a relevance of each particular document to the meeting. For example, an upcoming meeting can include M total number of participants (e.g., M=10), and a subset N of the M total participants (e.g., N=3) may have accessed and/or shared one or more documents prior to the meeting. The document(s) can be determined to be associated with the upcoming meeting based on at least a threshold quantity or percent of the participants (or invitees) accessing the document(s) prior to the meeting, and/or during the meeting, and/or based on determining that content of the document(s) is associated with other content in a meeting invite for the upcoming meeting (e.g., determining content of a document is similar to a title for the meeting invite).

When a document is determined to be relevant for an upcoming meeting, ASR used to transcribe audio during the upcoming meeting can be biased according to content of the document. For example, the document accessed by a subset of participants of the upcoming meeting can include multiple instances of the term "Cardinal," which can refer to a product to be discussed at the upcoming meeting. During the upcoming meeting, participants may frequently speak the term "Cardinal" in reference to the product, and ASR can be used to process audio data generated during the meeting to identify candidate interpretations for audio embodying the spoken term "Cardinal." For example, the candidate interpretations can include "garden hole," "card in a," "guard the ball," and "cardinal." Each candidate interpretation can be assigned a score based on a variety of different factors (e.g., relevance of an interpretation to other recent speech, context, location, etc.), and a candidate interpretation with a highest value score can be incorporated into a meeting document being generated by the meeting application and/or other application. However, in some implementations, one or more respective scores can be weighted according to whether their corresponding candidate interpretation is associated with the document(s) accessed by the subset of the participants. For instance, a score for the candidate interpretation "Cardinal" can be increased, and/or the other scores for the other candidate interpretations can be decreased based on the term "Cardinal" expressly appearing in the document(s) accessed by the subset of meeting participants.

In some implementations, the score can be based on a term frequency (TF) for the term "Cardinal" appearing in multiple different documents determined to be associated with a meeting and/or one or more participants and/or can be based on an inverse document frequency (IDF) for the term "Cardinal" in another corpus, such as a global corpus of Internet documents and/or in a corpus of training instances utilized in training model(s) utilized in ASR. Put another way, the score for a term can be generated such that more heavy biasing occurs for that term when it has a higher TF and/or a lower IDF as opposed to when it has a lower TF and/or higher IDF. For instance, biasing for a given term can be heavy when that term frequently appears in document(s) determined to be relevant to a meeting and/or when that term was not included in any (or only de minimis) training example(s) utilized in training ASR model(s). In these and other manners, ASR of speech during a meeting can be improved and, further, automated note taking and/or other features that rely on ASR results can be performed more accurately. This can preserve computational resources by reducing a number of inputs participants need to manually provide to their respective devices to edit incorrect ASR entries. This can also encourage more participants to confidently rely on ASR-based features over other manual features, which may distract participants from engaging with other meeting participants during the meeting.

In some implementations, the meeting application and/or other application can additionally or alternatively generate a meeting summary, action item(s), and/or other content based on various features of and/or interactions that can occur during a meeting. Such features can include participant note-taking, speech from one or more participants, a direct and/or an indirect request from a participant, visual content from the meeting, gestures from one or more participants, and/or any other features that can indicate content for incorporating into a summary. In some implementations, a portion of content included in a summary can be generated in response to multiple different participants talking during a portion of the meeting that is relevant to a particular topic. For instance, after a duration of time when a participant is talking, multiple other participants may offer feedback regarding a particular topic that the single participant was referring to. This can result in a summary item, which is based on the topic, being generated for the summary document in furtherance of creating a summary that incorporates content that is important to more participants of the meeting.

In some implementations, a summary item for the summary of a meeting can be automatically generated based on a relevance of meeting content (e.g., speech from one or more participants) to other content associated with the meeting (e.g., a title of a meeting invitation, content of attachments to the meeting invitation, content of files accessed by meeting participants prior to, during, and/or after the meeting). For example, a title of a meeting invitation can be "Meeting Regarding Phase II Cell Trials," and attachments provided with the meeting invitation can include spreadsheets with clinical trial data. During the beginning of the meeting, a participant may ask "How was everyone's weekend?", and other participants may respond by giving quick details about their weekend (e.g., "Good. We went to a concert at the waterfront."). However, because terms such as "weekend", "concert," and "waterfront" do not appear in the meeting title or the meeting attachments, the summary can be generated to not mention any content from this portion of the meeting.

In accordance with the aforementioned example, during the "Meeting Regarding Phase II Cell Trials," a first participant may raise their hand (in actuality and/or virtually via a "raise hand" interface element) while a second participant is talking about "Batch T Results" and make a request such as, "Bill, I don't think the Batch T Results are complete. Could you confirm after the meeting?" Image data embodying the hand raising by the first participant can be captured by a video camera (with prior permission from the participant(s)) and processed using one or more trained machine learning models and/or one or more heuristic processes. Alternatively, or additionally, content of the spoken request from the first participant can be captured as audio data (with prior permission from the first participant) and processed using one or more trained machine learning models and/or one or more heuristic processes. Based on these processes, the meeting application and/or other application can generate a summary item to incorporate into the summary being generated for the meeting. For instance, language processing can be utilized to determine that terms in the meeting title (e.g., "... Phase II Cell Trials ...") can often be associated with the terms such as "results." Based on this determination, content from the request from the first participant to the second participant can be ranked for inclusion in the summary above other meeting content (e.g., "How was everyone's weekend?") that may not be considered relevant enough to incorporate into the summary.

In some implementations, a summary item can be incorporated into a meeting summary document based on a threshold number (N) of individuals determined (with prior permission from the participants) to be making notes about a topic during the meeting. The summary item can then be generated to address the discussion for that particular topic. Alternatively, or additionally, an attention level(s) of participant(s) can be determined (with prior permission from participants) for a particular topic, and/or a change in attention level(s) can be determined for participant(s) during a discussion of a particular topic. Based on the increase, or change, in attention level during a discussion of a particular topic, the particular topic can be the subject of a summary item to be included in a summary document, or other document, associated with the meeting. In some implementations, determining attention level of participants can be performed using one or more cameras, with prior permission from the participants, during a meeting that is an in-person meeting, virtual video conference (e.g., when all participants connect to the meeting via the internet or other network connection), and/or any meeting having a combination of remote and in-person participants.

In some implementations, a summary item that is generated by the meeting application and/or automated assistant can be an "action item," at least based on the corresponding meeting content (e.g., the content that served as a basis for the action item) and/or a context in which the corresponding meeting content was presented. In accordance with the aforementioned example, content provided by the first participant (e.g., "... I don't think the Batch T results are complete. Can you confirm after the meeting?") to the second participant (e.g., "Bill") can be incorporated into the meeting summary as an action item for the second participant. The action item can be included in the meeting summary with an embedded link to any file that the action item may refer to (e.g., "Batch T results" document) and/or with a reminder for the second participant and/or the first participant. In some implementations, the reminder can be rendered for the first participant, the second participant, and/or any other person, in response to one or more conditions being satisfied. The conditions can be, for example, selected based on content and/or context of the meeting. For example, the second participant can receive a notification regarding the action item in response to the second participant accessing the "Batch T results" document after the meeting. Alternatively, or additionally, the first participant and/or the second participant can receive a notification regarding the action item subsequent to, and/or during, another meeting in which the first participant and the second participant are invitees. Alternatively, or additionally, the first participant and/or the second participant can receive a notification regarding the action item in response to receiving and/or sending a message to another attendee (e.g., a third participant) of the meeting from which the action item derived.

In some implementations, a meeting summary can be non-static and/or generated in real-time as a meeting is ongoing, thereby allowing participants to verify that certain items are included in the summary and/or to further modify the summary before the meeting is completed. For instance, an action item that is automatically included in a meeting summary can be modified by a participant to be directed to one or more additional participants that the action item may not have been initially directed to. Alternatively, or additionally, the summaries of topics discussed (e.g., "Batch B results") that are automatically included in the meeting summary before the meeting ends can be editable for adding, removing, modifying, and/or otherwise altering the summaries of the topics. In some implementations, portions of the summary that have been automatically generated can be edited automatically when, for example, a particular topic is brought up again during the meeting, additional contextual data becomes available, additional content (e.g., meeting attachments, documents, files, etc.) becomes available and/or is otherwise accessed by participants, and/or when additional meeting information otherwise becomes available.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
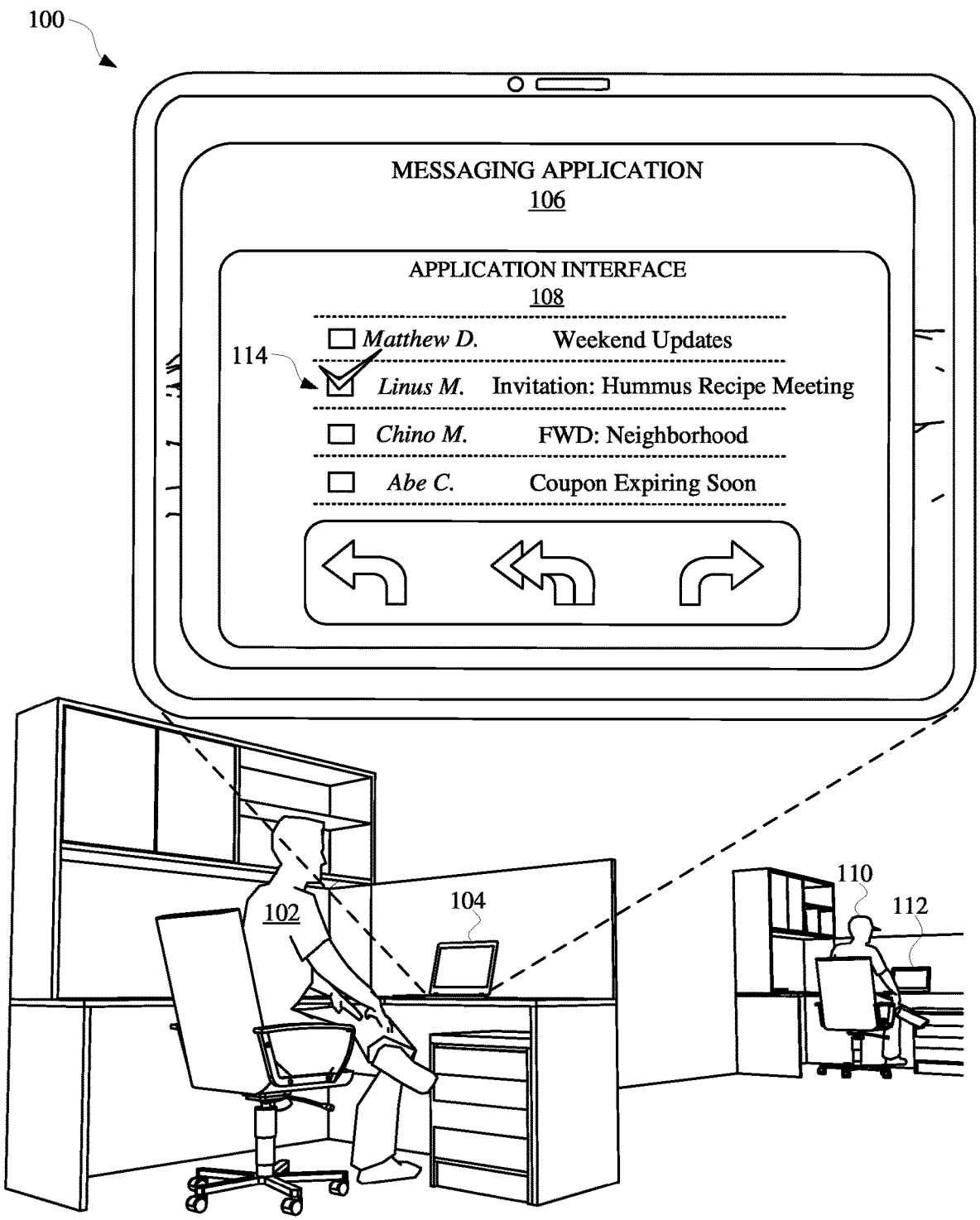
FIG. 1A, FIG. 1B, FIG. 1C, FIG. 1D, and FIG. 1E illustrate views of speech biasing and document generation being performed for a meeting based on data created prior to and/or during the meeting.

FIG. 1A, FIG. 1B, FIG. 1C, FIG. 1D, and FIG. 1E illustrate a view 100, a view 120, a view 140, a view 160, and a view 180, respectively, of speech biasing and document generation being performed for a meeting based on data created prior to and/or during the meeting. Such operations can be performed in order to minimize a number of inputs that a user must manually input during a meeting, thereby streamlining certain types of meetings and preserving computational resources of meeting-related devices. Additionally, the accuracy of certain meeting documents can be improved using certain processes to generate meeting summary documents and/or meeting action items.

Prior to a meeting, and as illustrated in FIG. 1A, a first user 102 (e.g., invitee and/or participant) can be accessing, via their computing device 104, a meeting invitation 114 that was communicated to the first user 102 via a meeting application 106. The meeting invitation 114 can have a title that is rendered at an application interface 108 of the meeting application 106, and the title can include terms that can serve as a basis for biasing ASR during the meeting. Alternatively, or additionally, content of the meeting invitation 114 (i.e., a first document) can include words and/or phrases (i.e., terms) that can indicate whether certain topics discussed during the meeting would be relevant enough to include in a meeting document and/or designated as an action item. Other users that receive that meeting invitation 114, such as a second user 110 who is operating an additional computing device 112, can also influence whether certain data will be considered relevant to the meeting or not.

Figure 1B:
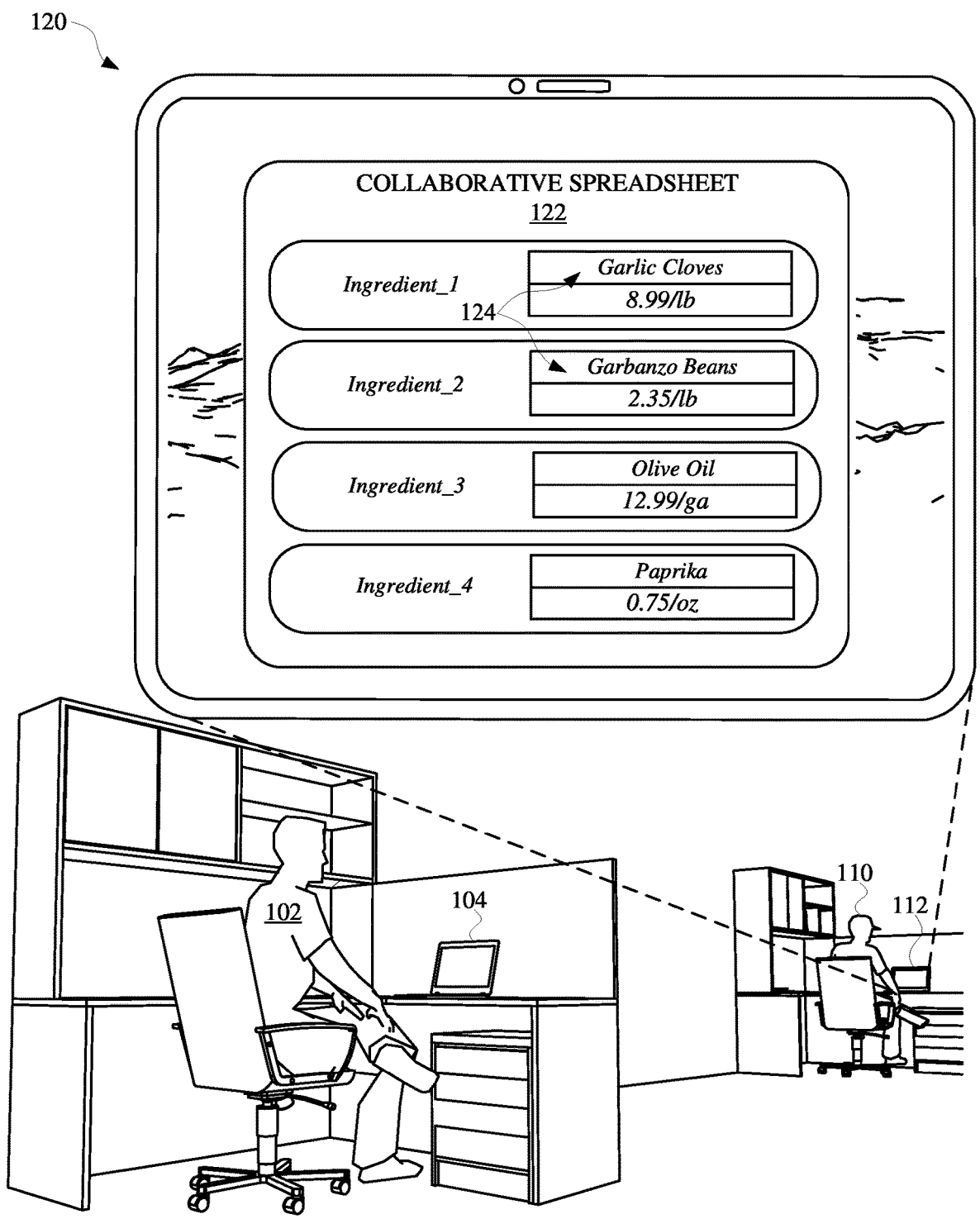

For example, the second user 110 can be viewing a collaborative spreadsheet 122 via their computing device 112, as illustrated in view 120 of FIG. 1B. The collaborative spreadsheet 122 (i.e., a second document) can be accessible to one or more meeting invitees and can therefore be considered relevant to the meeting by a meeting application and/or other assisting application. For example, the collaborative spreadsheet 122 can be a cloud-based document and can be accessible to all of the meeting invitees by virtue of being created/owned by one of the meeting invitees and shared with all other of the meeting invitees. It can be determined to be relevant to the meeting based on being shared with at least a threshold quantity or percentage of (e.g., all of) the meeting invitees, and/or based on whether the document was presented to one or more participants during the meeting. Optionally, determining the collaborative spreadsheet 122 is relevant can also be based on determining that it is shared with less than a threshold quantity or percentage of individuals that are not meeting invitees. For instance, a first document that is shared with only all meeting invitees can be determined to be relevant to the meeting whereas a second document that is shared with all meeting invitees and is also shared with N additional individuals (e.g., 50 additional) that are not meeting invitees can be determined to not be relevant to the meeting. Alternatively, or additionally, the collaborative spreadsheet 122 can be considered relevant to the meeting, by the meeting application, based on content of the collaborative spreadsheet 122. For instance, the collaborative spreadsheet 122 can include content associated with content of the meeting invitation 114, thereby indicating that the collaborative spreadsheet 122 is relevant to the meeting. The content of the collaborative spreadsheet 122 can include, for example, prices for ingredients 124 for "hummus," and "hummus" can be a term mentioned in the meeting invitation (e.g., the meeting invitation title and/or meeting invitation description section). Based on this correspondence, various portions of document content can be processed (e.g., using inverse document frequency, and/or other document review processes) to identify portions that may be relevant to ASR biasing and/or other process(es) to be performed during the meeting. These portions can then be utilized as a basis for biasing ASR during the meeting, identifying relevant content (e.g., inputs from participants) during the meeting, and/or identifying conditions for action item reminders and/or conditions for action item fulfillment.

Figure 1C:
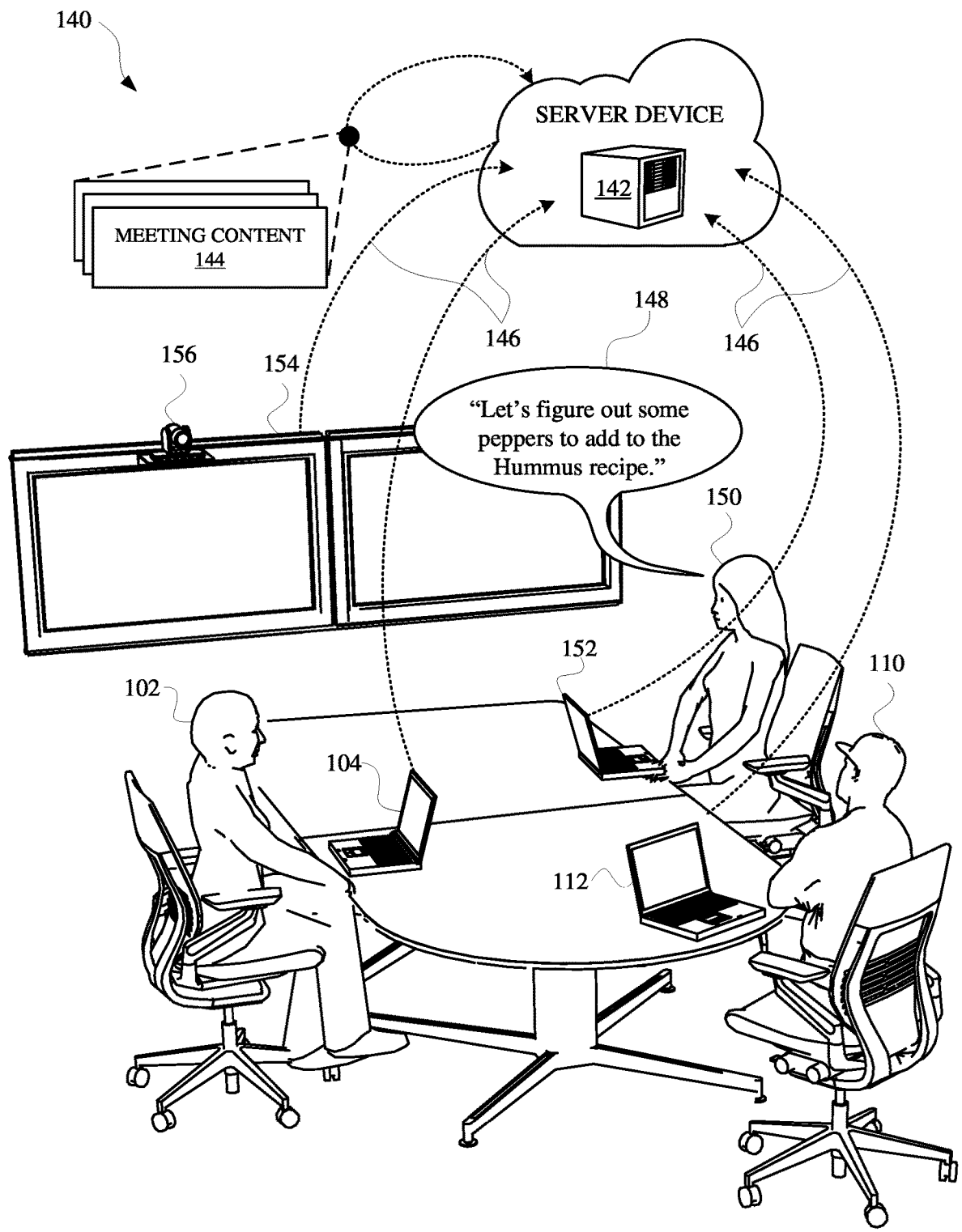
Figure 1D:
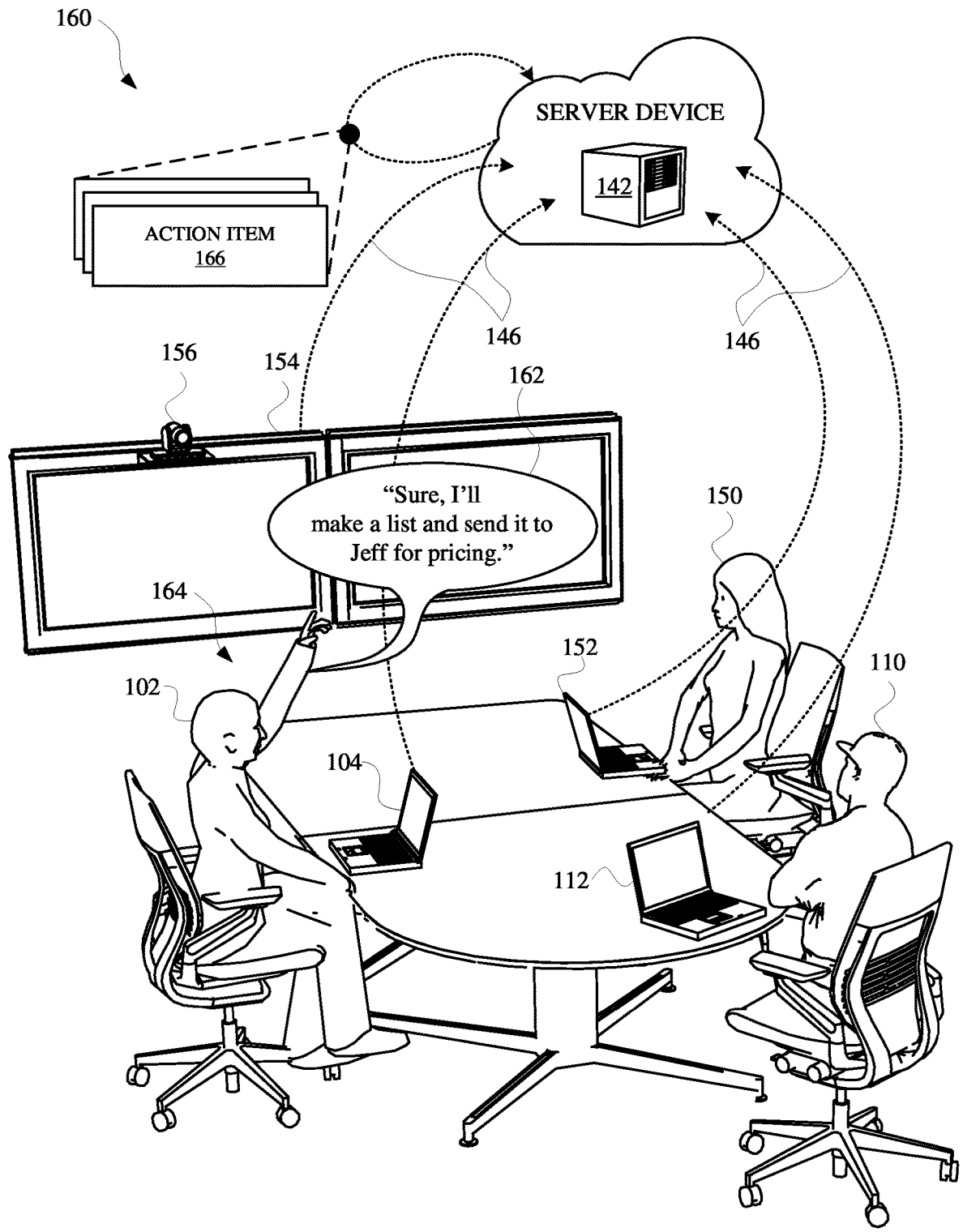

In some implementations, the meeting application, computing device, and/or server device 142 can determine that the meeting has begun (e.g., as illustrated in FIG. 1C) based on data available from one or more devices and/or applications. For instance, calendar data and/or data from a meeting application can be utilized to determine that the meeting has begun, and/or that one or more persons have joined the meeting. When the meeting has begun, data 146 from various devices can be processed in furtherance of biasing ASR and generating a meeting document, which can include meeting content 144, which can be void of any data that was not relevant to the meeting (e.g., other talking points, such as "small talk," during breaks in the meeting). In some instances, the data 146 can include audio data that embodies speech from various participants of the meeting.

For example, the data 146 can characterize a spoken utterance 148, such as "Let's figure out some peppers to add to the Hummus," provided by a third user 150. The data 146 can be processed using ASR that has been biased according to instances of data that have been identified as relevant to the meeting. For instance, the meeting invitation 114 having the title with a particular term "hummus" can cause one or more candidate terms, such as "hummus" and/or "recipe" for a transcription of the spoken utterance 148, to be assigned a higher probability value and/or weight value than other words and/or phrases that may be similarly pronounced (e.g., "honeys" for "hummus," and "rest in peace" for "recipe"). Alternatively, or additionally, a resulting transcription of the spoken utterance 148 can be processed to determine whether the content of the transcription is relevant enough to the meeting to be included in meeting content 144 for a meeting document. For instance, when the content of the transcription includes the terms "hummus" and "recipe," and data accessed prior to and/or during the meeting includes the terms "hummus" and "recipe," the content of the transcription can be considered relevant enough to incorporate into a meeting document. In accordance with the aforementioned example, because the second user 110 was viewing hummus ingredients prior to the meeting, and the meeting invitation 114 includes "hummus recipe" in the title, the content of the transcription for the spoken utterance 148 can be considered relevant enough to include in the meeting content 144 and/or the meeting document.

In some implementations, non-verbal gestures and/or other non-verbal cue(s) captured by one or more sensors during the meeting can be utilized to determine a relevance of input from participants to the meeting. For instance, in response to the spoken utterance 148 from the third user 150, the first user 102 can provide a separate spoken utterance 162, such as, "Sure, I'll make a list and send it to Jeff for pricing." While providing the spoken utterance 162, and/or within a threshold duration of time of providing the spoken utterance 162, the first user 102 can also perform a non-verbal gesture 164, which can indicate an importance of what they are speaking. Audio data and image data, captured by a camera 156 and computing device 154, with prior permission from the participant(s), can be processed at a local computing device and/or server device 142 to determine whether to incorporate the response from the first user 102 into a meeting document. Additionally, or alternatively, the data can be processed to determine whether to generate an action item 166 based on the spoken utterance 162 and/or one or more conditions for the action item 166.

For example, audio and/or video data can be processed using one or more heuristic processes and/or one or more trained machine learning models to determine whether a text entry should be included in a meeting document. In some implementations, this determination can be based on whether the spoken utterance 162 was provided within a threshold duration of time of the third user 150 providing the spoken utterance 148. Alternatively, or additionally, the determination of whether the text entry should be included in the meeting document can be based on whether the spoken utterance 162 is responsive to a meeting-relevant input (e.g., spoken utterance 148), and/or whether the spoken utterance 162 is directed to someone who has provided a meeting-relevant input. In some implementations, the text entry can be assigned a score according to one or more of these, and/or other factors, and the score can be compared to a score threshold. When the score satisfies the score threshold, the text entry can be incorporated into the meeting document (e.g., a meeting "summary" document).

When the text entry is determined to be incorporated into the meeting document, a determination can be made regarding whether the text entry is an action item and, if so, whether the action item should have conditions. For instance, the text entry corresponding to the spoken utterance 162 can be designated as an action item based on the first user 102 expressing their willingness to take an action (e.g., "make a list"). Alternatively, or additionally, the action item can be assigned one or more conditions based on the content of the text entry and/or a context in which the spoken utterance 162 was provided. For instance, the action item can be stored with conditional data that characterizes a reminder, which can be rendered the next time the first user 102 communicates with the second user 110 (e.g., "Jeff"). Alternatively, or additionally, the action item can be stored with conditional data indicating that the action item is fulfilled when the first user 102 communicates a "list" of "peppers" to the second user 110. In this way, not only can the action item be incorporated into the meeting document for accurately tracking action items, but also for establishing reminders and/or having action items be automatically updated based on user actions (with prior permission from the user(s)).

Figure 1E:
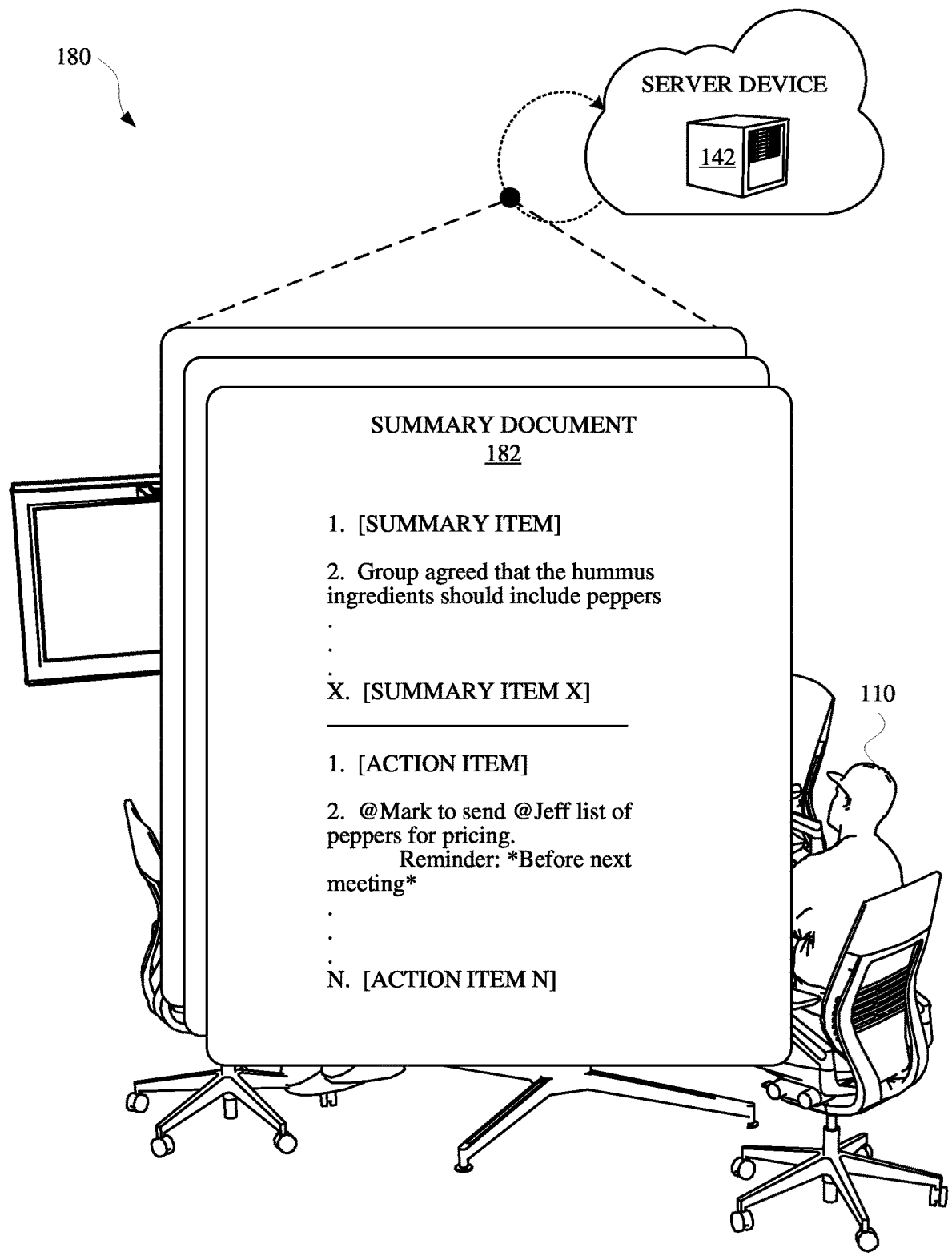

FIG. 1E illustrates a view 180 of a summary document 182 that can be automatically created by the meeting application and/or other application based on content of a meeting and/or data that is associated with the meeting. For instance, the summary document 182 can include a list of summary items that summary various topics discussed during the meeting, and action items that were identified during the meeting. In some implementation, the summary items can embody terms that may, or may not, have been expressly stated during the meeting, either verbally or in writing. For instance, a summary item can include, "Group agreed that the hummus ingredients should include peppers," which can be a sentence that was not expressly stated in those terms during the meeting. Alternatively, or additionally, the summary document can be generated with a list of action items that were identified during the meeting. In some implementations, action items can be generated to include reminders (e.g., reminder before the next meeting) that can be rendered for certain participants when certain conditions are satisfied. Alternatively, or additionally, action items can included embedded links to certain data (e.g., documents, websites, images, contact info, and/or any other data), such as an electronic address for a participant (e.g., "@Jeff"), and/or certain reminders (e.g., Reminder before next meeting). In some implementations, the summary document 182 can be viewed during the meeting, thereby allowing participants to edit the meeting document 182 as it is being created. Alternatively, or additionally, the summary document 182 can have embedded data that is editable, such as a participant can edit when a certain reminder will be rendered, and/or edit whether an action item is still outstanding or not.

Figure 2:
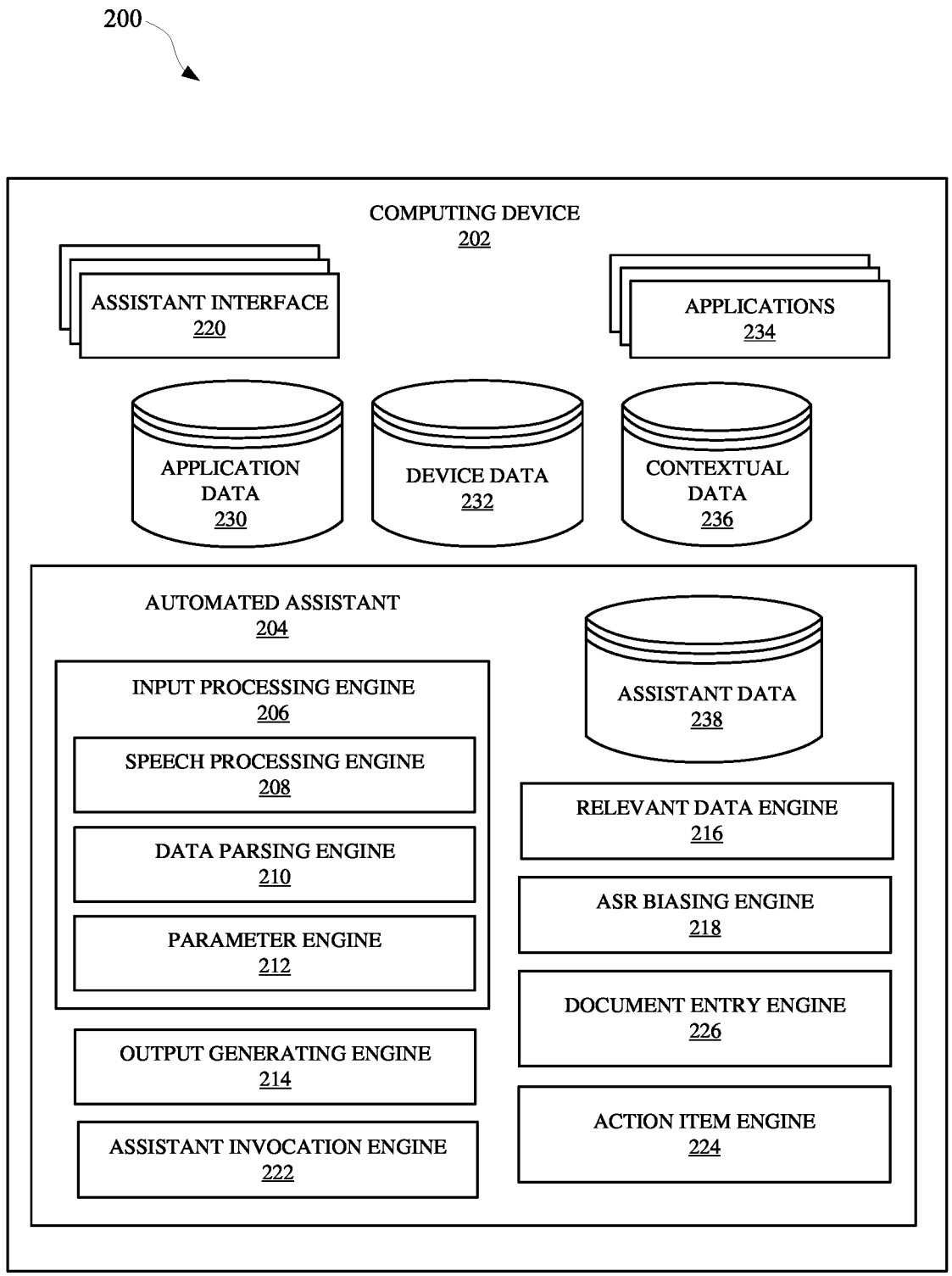
FIG. 2 illustrates a system that provides an application, such as an automated assistant and/or a meeting application, that can bias ASR and/or generate meeting documents based on data created prior to and/or during the meeting.

FIG. 2 illustrates a system 200 that provides an application, such as an automated assistant and/or a meeting application, that can bias ASR and/or generate meeting documents based on data created prior to and/or during the meeting. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between one or more users, and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models.

The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language content from a user. In some implementations, the computing device 202 can include a touch interface and can be void of a camera, but can optionally include one or more other sensors.

The computing device 202 and/or other third party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 (e.g., a meeting application) can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. In some implementations, speech recognition can be biased according to operations of an ASR biasing engine 218, which can proactively bias certain instances of audio according to data that is available prior to, and/or during, the capturing of the audio. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken inputs from a user based on features of a context and/or an environment.

In some implementations, the system 200 can include a relevant data engine 216 that can process data from various sources for determining whether the data is relevant to an upcoming meeting and/or other gathering of one or more persons. For instance, the relevant data engine 216 can utilize one or more heuristic processes and/or one or more trained machine learning models to process data for determining whether a meeting is expected to occur, or is occurring. Based on this determination, the relevant data engine 216 can process data from various sources (e.g., various devices, applications, servers, and/or any other sources that can provide data associated with a meeting) for determining whether the data is relevant to a particular meeting. In some implementations, relevance of data can be characterized by a metric (i.e., score) that can be compared to a relevance threshold. When the metric satisfies the relevance threshold, the data can be considered relevant to the meeting. For example, one or more trained machine learning models can be utilized to generate an embedding from data that may be relevant to a meeting. For example, the trained machine learning model(s) can include Word2Vec, BERT, and/or other model(s) that can be used to process data (e.g., text data) and generate a semantically meaningful reduced dimensionality embedding in latent space. The embedding can be in a latent space, and a distance between the embedding and a meeting embedding (also mapped to the latent space) can be characterized by the metric. The metric can be compared to the relevance threshold in determining whether the data is relevant to the meeting (e.g., if the distance is closer than the threshold, the data can be determined to be relevant). The meeting embedding can be generated based on processing one or more features of the meeting using one or more trained machine learning models (e.g., those used in generating the data embedding). For example, the meeting feature(s) can include a title of the meeting, description or notes included with the meeting invite, a time for the meeting, a time that a meeting invitation was scheduled, a number of participants for the meeting, and/or any other features associated with the meeting.

In some implementations, when one or more instances of data relevant to a meeting are identified, an ASR biasing engine 218 can process the one or more instances of data to determine whether to bias ASR based on content of the data. For example, terms in the content of the data can be identified using one or more heuristic processes and/or one or more trained machine learning models. In some implementations, an inverse document frequency (IDF) measure for a term in the data can be identified and utilized to determine whether ASR should be biased for that particular term. For example, the IDF measure can be based on frequency of terms in spoken utterances utilized in training ASR model(s) utilized in ASR. For instance, a first term in the data, such as "garbanzo", can be selected for being used to bias ASR based on it having a high IDF measure (e.g., very few utterances used in training the ASR model(s) included "garbanzo"). On the other hand, a second term in the data, such as "oil", can not be selected for being used to bias ASR based on it having a high IDF measure. Further, in some implementations the degree of biasing for a term can be a function of its IDF measure and/or its term frequency (TF) measure (e.g., a function of how often it appears in the data). Additional and/or alternative techniques can be utilized in determining whether a term is significant to an instance of data and/or the meeting, such as where the term is utilized in the document (e.g., being used in a title, a first sentence, and/or a conclusion can be more significant than being used in the "middle" of the document) and/or whether the term is also utilized in the meeting invite. When a particular term is determined to be significant to an instance of data and/or the meeting, that particular term can be utilized in biasing ASR during the meeting. For example, that particular term can be weighted and/or assigned a higher valued score or probability accordingly during ASR of spoken inputs during the meeting.

In some implementations, the system 200 can include a document entry engine 226 that can utilize data generated by the ASR biasing engine 218 and/or the input processing engine 206 to automatically generate a meeting document(s). A meeting document can be, for example, generated to represent a summary of a meeting, and can therefore describe discussion points that were relevant to a meeting, while omitting meeting discussion content that may not be relevant to the meeting. In some implementations, an embedding can be generated for transcribed text and/or audio data during a meeting, and the embedding can be mapped to a latent space that can also include a meeting embedding. When an embedding distance between the embedding and meeting embedding is determined to satisfy a threshold for incorporating the text entry into the meeting document, the text entry can be incorporated into the meeting document. In some implementations, a candidate text entry can be rendered at an interface during the meeting, and a participant and/or other person can select to incorporate the text entry into the meeting document, regardless of whether the embedding distance satisfies the threshold.

In some implementations, the system 200 can include an action item engine 224, which can determine whether a text entry should be designated as an action item in the meeting document and/or other data, and/or whether the action item should have certain conditions. For example, one or more heuristic processes and/or one or more trained machine learning models can be utilized to determine whether an input from a participant of a meeting should be considered an action item. For instance, an action item can refer to an input that describes a task to be completed by at least one participant, or other person, subsequent to the input being provided during the meeting. Therefore, inputs that embody a request for another participant and that may optionally have a deadline (e.g., "Let's follow up on the budget during the next meeting.") can be assigned a higher valued action item score than other inputs that may not embody a request or deadline (e.g., "Did you enjoy your lunch?").

In some implementations, content of an input that is a basis for an action item can be processed, along with any other relevant data, to identify conditions that should be stored in association with the action item entry. For instance, reminder conditions and/or fulfillment conditions can be generated based on content of a text entry and/or other input, and/or any data associated with an input during a meeting. In some implementations, a condition expressly provided in an input (e.g., "Send me the report after the meeting.") can be processed to generate a condition that can be stored with an action item (e.g., actionItem("Send report", nextMeetingTime( ) reminderEmail( )). Alternatively, or additionally, a condition inferred from data associated with an input (e.g., Document accessed during meeting) can be utilized to generate a condition for an action item (e.g., actionItem ("Send report", nextMeetingTime( ) fulfillmentCondition (email, "report," "budget," jeff@email.com))). In this way, action items can be generated automatically during a meeting, without necessitating manual user inputs that may distract users from participating in meetings and waste computational resources at certain computing devices and their respective interfaces.

Figure 3:
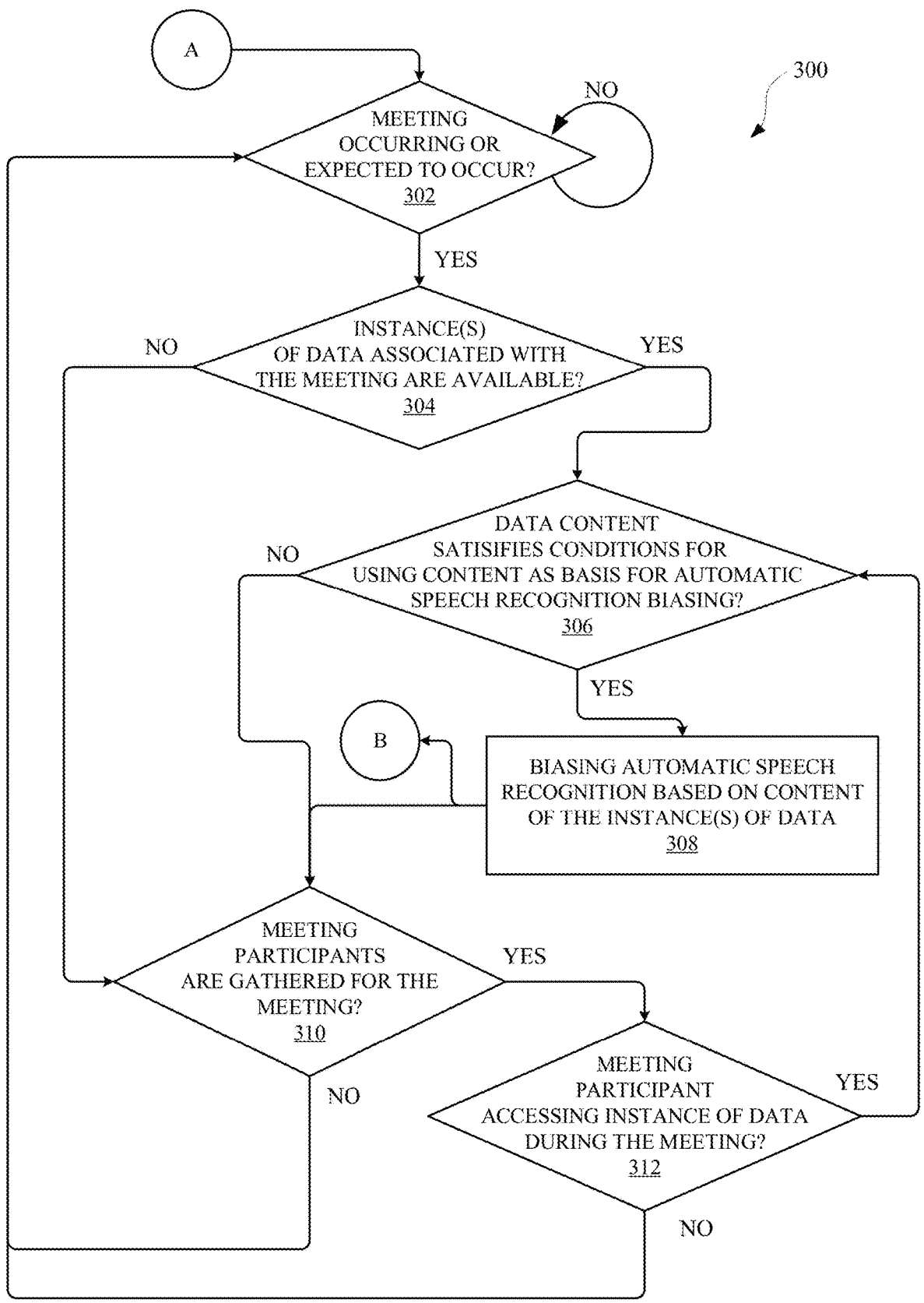
FIG. 3 illustrates a method for biasing automatic speech recognition according to instances of data determined to be associated with a meeting and/or meeting participants before and/or during the meeting.

FIG. 3 illustrates a method 300 for biasing automatic speech recognition according to instances of data determined to be associated with a meeting and/or meeting participants before and/or during the meeting. The method 300 can be performed by one or more computing devices, applications, and/or any other apparatus or module that can be associated with an automated assistant. The method 300 can include an operation 302 of determining whether a meeting is occurring or is expected to occur. The determination at operation 302 can be performed by an application, such as a meeting application and/or an automated assistant application, that is accessible via a computing device (e.g., a server device, portable computing device, etc.). The determination at operation 302 can be performed in furtherance of determining whether users associated with the application will be participating in a meeting in which one or more participants may communicate information to one or more other participants. In some implementations, the determination can be based on data that is accessible to the application, such as contextual data (e.g., a schedule stored by the application) and/or other application data (e.g., a meeting invitation provided to multiple invitees).

The method 300 can proceed from the operation 302 to an operation 304, which can include determining whether any instances of data associated with the meeting are available. Instances of data can be determined to be associated with the meeting using one or more heuristic processes and/or one or more trained machine learning models. For instance, data associated with one or more invitees and/or participants of a meeting can be processed (with prior permission from users) to determine whether the data is relevant to the meeting. The data can include files (e.g., documents) that one or more invitees of the meeting have permission to access and/or have accessed within a threshold duration of time prior to the meeting. In some implementations, the duration of time can be at least partially based on a time when at least one invitee received the meeting invitation for the meeting. For instance, the threshold duration of time can be directly proportional to an amount of time between when the meeting invitation was first sent or received by at least one invitee, and a scheduled time for the meeting. In this way, the threshold duration of time before a meeting that a relevant file may have been accessed can be greater for meetings that are planned further in advance. Alternatively, the threshold duration of time can be based on other factors, such as a duration for the meeting, a number of invitees for the meeting, a location for the meeting, and/or any other feature that can be identified for the meeting.

In some implementations, instances of data can be determined to be relevant for a meeting based on content of the instances of data compared to content of data provided with a meeting invitation (e.g., a title of the meeting invitation, description within the meeting invitation, attachments to the meeting invitation, etc.). For example, content of a file can be determined to be relevant to a meeting when terms within the file are also present in, and/or synonymous with, terms in the meeting invitation. In some implementations, certain terms, determined to be relevant for characterizing a particular file and comparing with a meeting invitation, can be identified using inverse document frequency metrics for those particular terms. Alternatively, or additionally, certain terms, determined to be relevant for characterizing a particular file and comparing with a meeting invitation, can be identified using contextual data associated with the particular file.

In some implementations, instances of data can be determined to be relevant for a meeting based on a number of participants that a particular instance of data is shared with and/or whether the particular instance of data includes term(s) that correspond to content associated with a meeting (e.g., meeting invitation, audio captured during a meeting with prior permission from participants, documents created and/or shared by participants, etc.). For example, a document that includes no terms (e.g., no terms considered relevant per IDF) associated with a meeting invitation, but is shared with 80% of participants of a meeting may not be considered relevant for purposes of ASR biasing. However, a document that includes one or more terms (e.g., terms considered relevant per IDF) associated with the meeting invitation and that is shared with 60% of meeting participants can be considered relevant for purposes of ASR biasing. In some implementations, a degree to which terms embodied in an instance of data are considered relevant can be based on a variety of different features of a meeting. Alternatively, or additionally, a threshold for a number of participants that a document is shared before considering the document to be relevant can be based on the number of relevant terms in the document (e.g., the percentage threshold can be inversely proportional to the degree of relevance of certain document terms).

Alternatively, or additionally, instances of data can be considered relevant or not relevant based on whether a threshold percentage of participants accessed the data during the meeting. For instance, a document may not be considered relevant strictly based on a single participant accessing the document during a majority of the meeting (e.g., the single participant may not be full attentive, and maybe distracted by content unrelated to the meeting). Rather, a document can be considered relevant when at least a threshold percentage of participants accessed the data (e.g., a document) during the meeting, and/or the threshold percentage of participants accessed the data for a threshold duration of time (e.g., at least a threshold percentage of time of the total scheduled time for the meeting). In this way, ASR can be biased according to terms in documents considered, during the meeting, to be relevant to the meeting, without considering certain data that may only be relevant to an individual during a meeting.

When instances of data are determined to be associated with the meeting, the method 300 can proceed from the operation 304 to an operation 306, which can include determining whether data content satisfies condition(s) for using the content as a basis for automating speech recognition biasing. In some implementations, data content can satisfy a condition for using the content as a basis for biasing automatic speech recognition when a content embedding is determined to be a threshold distance, in a latent space, from a meeting embedding. In other words, meeting data (e.g., meeting invitation, meeting attachments, etc.) can be processed using one or more trained machine learning models to generate a meeting embedding. Additionally, the data content can also be processed using one or more trained machine learning models to generate a content embedding. Each embedding can be mapped to a latent space, and their distance in latent space can be determined. When the distance between embeddings satisfies a distance threshold, a condition for biasing automatic speech recognition based on the data content, and/or one or more terms within the data content can be satisfied.

Alternatively, or additionally, data content can satisfy a condition for biasing automatic speech recognition based on terms in the data content when properties of a term in both the data content and meeting data satisfy one or more conditions. For instance, when a term shared by both the data content and the meeting data is determined to have a particular inverse document frequency, the condition for biasing automatic speech recognition can be satisfied. Alternatively, or additionally, when a shared term appears in similar sections of each respective source (e.g., title, first sentence, summary section, etc.), the condition for biasing automatic speech recognition can be considered satisfied.

When data content satisfies one or more conditions for biasing automatic speech recognition, the method 300 can proceed from the operation 306 to an operation 308, which can include biasing automatic speech recognition based on content of the instance(s) of data. Alternatively, when data content does not satisfy conditions for biasing automatic speech recognition, the method 300 can proceed from the operation 306 to an operation 310. The operation 308 of biasing automatic speech recognition can be performed according to one or more different processes. For example, in some implementations, automatic speech recognition can be performed by assigning probabilities to various hypotheses for portions of speech (e.g., words, phonemes, and/or other hypothetical portions of speech). The probabilities can then be adjusted according to whether any of the portions of speech correspond to any of the data content associated with the meeting. For instance, probabilities assigned to phonemes for a spoken term such as "Quadratic" can be increased when the term appears in instances of data associated with the meeting. Alternatively, or additionally, probabilities assigned to phonemes for a spoken term such as "Insurance" can be assigned a higher probability than phonemes for the term "assurance" when one or more participants have written the term "insurance" in meeting notes documents during the meeting. In this way, automatic speech recognition biasing can be performed in real-time, during a meeting, as additional content related to the meeting is created and/or discovered.

Figure 4:
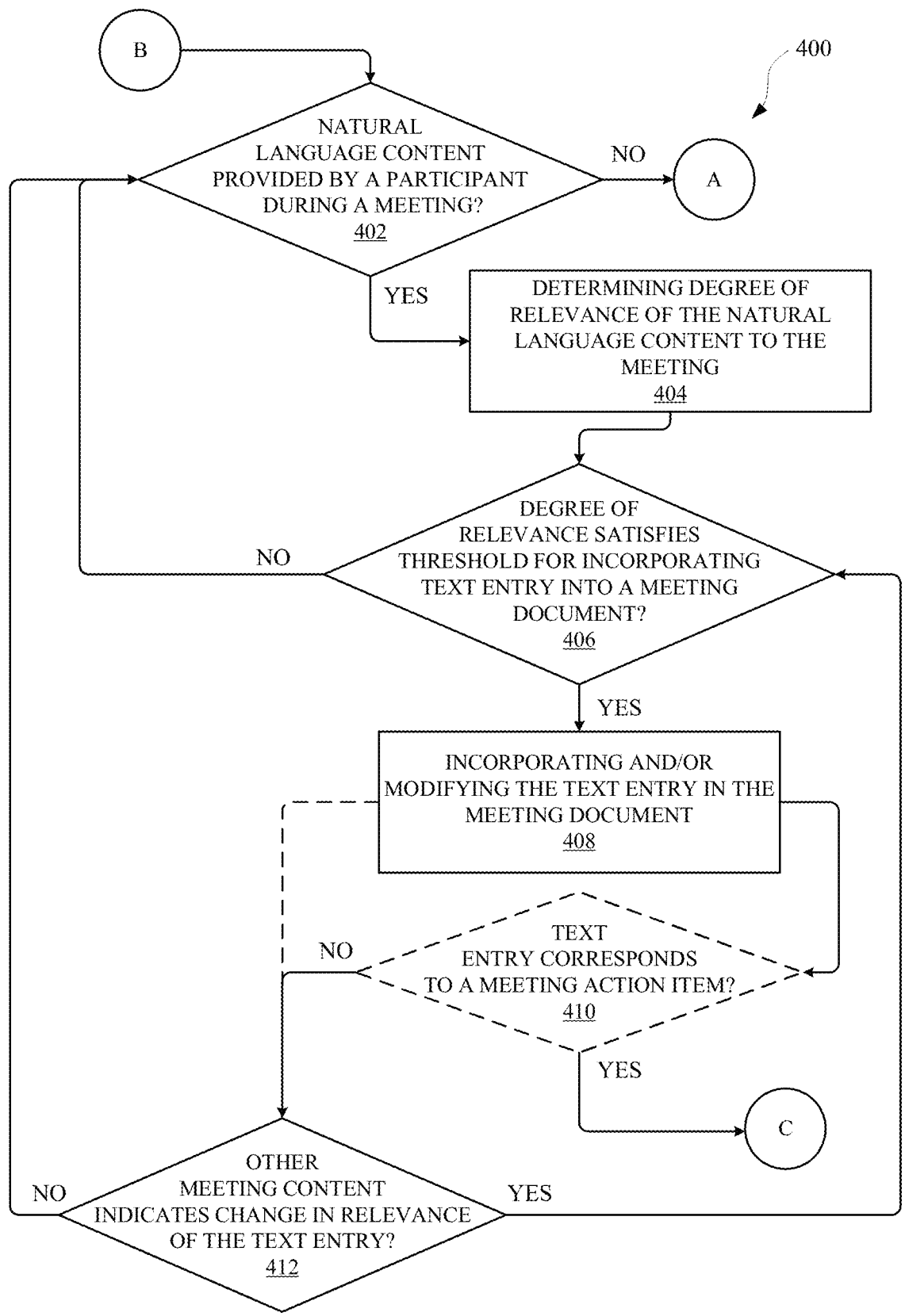
FIG. 4 illustrates a method for automatically incorporating certain content into a meeting document in furtherance of generating a meeting summary and/or other type of document based on content of a meeting.

The method 300 can proceed from the operation 308 to an operation 310, and optionally, via continuation element "B," to an operation 402 of method 400, as illustrated in FIG. 4. The operation 310 can include determining whether meeting participants and/or invitees are gathering for the meeting. When meeting participants and/or invitees are determined to be gathered for the meeting (e.g., based on schedule data, geolocation data, meeting application data, video data, etc.), the method 300 can proceed from the operation 310 to an operation 312. Otherwise, when the participants and/or invitees have yet to gather for the meeting, the method 300 can proceed from the operation 310 to the operation 302. The operation 312 can include determining whether any meeting participant (or other person associated with the meeting) is accessing any instance of data during the meeting. For instance, the data can include a notes document being accessed by a participant, a portion of a transcript of the meeting, one or more different types of media files (e.g., images, video, etc.), and/or any other data that can be accessed by a person. When at least one participant is determined to be accessing an instance of data during the meeting, the method 300 can return to the operation 306 for further biasing automatic speech recognition according to content of the data being accessed. Otherwise, the method 300 can proceed from the operation 312 to the operation 302 for determining whether the meeting is still ongoing and/or another meeting is expected to occur.

FIG. 4 illustrates a method 400 for automatically incorporating certain content into a meeting document in furtherance of generating a meeting summary and/or other type of document based on content of a meeting. The method 400 can be performed by one or more applications, devices, and/or any other apparatus or module capable of interacting with a participant of a meeting. The method 400 can include an operation 402, which can optionally be a continuation of the method 300, as indicated by continuation element "B" illustrated in FIG. 3 and FIG. 4. The operation 402 can include determining whether natural language content has been provided by a participant (or other person associated with the meeting) during the meeting. The natural language content can be, for example, a spoken utterance from a participant of the meeting (e.g., a lunch meeting, university class, family dinner, and/or any other gathering) regarding a particular topic of the meeting. The spoken utterance can be, for example, "I like that idea. We should each think about how we can implement that into our individual projects."

When natural language content is provided by a participant of the meeting, the method 400 can proceed from the operation 402 to an operation 404. Otherwise, the method 400 can optionally proceed from the operation 402, via continuation element "A," to the operation 302 of the method 300, as illustrated in FIG. 3 and FIG. 4. The operation 404 can include determining a degree of relevance of the natural language content to the meeting. In some implementations, when the natural language content is a written input to an application, the degree of relevance can be based on whether one or more participants provided text inputs and/or spoken inputs similar to the written input. Alternatively, or additionally, when the natural language content is a spoken input captured by one or more audio interfaces present during the meeting (e.g., a video conference in which participants are at their respective home office using their laptop), the degree of relevance can be based on whether one or more other participants provided similar spoken and/or written inputs. For instance, a greater degree of relevance can be assigned to a spoken input that is reflected (e.g., "See if I can implement Keith's idea into my own project.") in a written note application by another participant, compared to if the other participant did not reflect (e.g., no meeting participant's notes mention "Keith's idea") the spoken input in their written notes.

Alternatively, or additionally, a degree of relevance to be assigned to natural language content provided by a participant can be based on whether the natural language content is associated with any meeting documents and/or other instances of data associated with the meeting. For example, natural language content embodying terms included in a title and/or other portion of a meeting invitation can be assigned a higher degree of relevance than other natural language content that does not otherwise have any other terms relevant to the meeting. Alternatively, or additionally, the natural language content embodying terms included in other data (e.g., messages between invitees, media accessed by invitees, locations visited by invitees, and/or any other relevant data, with prior permission from the participant(s)) associated with the meeting, can be assigned a higher valued degree of relevance than other natural language content that does not embody such terms.

The method 400 can proceed from the operation 404 to an operation 406, which can include determining whether the degree of relevance satisfies a threshold for incorporating a text entry characterizing the natural language content into a meeting document (e.g., an automatically generated meeting summary document). When the degree of relevance assigned to the natural language content satisfies the threshold, the method 400 can proceed to an operation 408. Otherwise, the method 400 can return to the operation 402. In some implementations, the threshold for incorporating a text entry can be based on one or more inputs from one or more participants. Alternatively, or additionally, the threshold can be based on a number of persons attending a meeting, a frequency of inputs from users during a meeting, a volume of content (e.g., a number of words, phrases, pages, etc.) provided during a meeting, a location for a meeting, a modality for a meeting (e.g., video, in-persons, audio-only, etc.), and/or any other properties of a meeting.

The operation 408 can include incorporating and/or modifying a text entry in a meeting document. In some instances, a text entry can be incorporated into a meeting document to summarize spoken inputs and/or gestures from one or more participants for future reference. In this way, participants can bypass providing manually typed inputs to a meeting document during and/or after a meeting to summarize portions of meetings. This can preserve resources at each computing device that may typically be utilized to process such inputs. In some implementations, the method 408 can optionally include an operation 410 of determining whether a text entry corresponds to a meeting action item. For instance, a meeting action item can be a task created by one or more participants during a meeting that one or more persons should take action on (e.g., gathering certain information prior to a follow-up meeting). This determination can be based on a manual input from a participant and/or other person to expressly designate a text entry as an action item. Alternatively, or additionally, the determination can be based on terms included in the text entry, a detected tone of the text entry (e.g., an inquisitive tone), a context in which the text entry was entered into the meeting document (e.g., a moment in the meeting in which a particular participant is reciting what they need to do before the next meeting). When the text entry is determined to correspond to an action item, the method 400 can optionally proceed from the operation 410, via continuation element "C," to an operation 502 of a method 500, as illustrated in FIG. 4 and FIG. 5.

When the text entry is determined to not correspond to an action item, and/or the operation 410 is optionally bypassed, the method 400 can proceed to an operation 412. The operation 412 can include determining whether other meeting content indicates a change in relevance to the text entry. For example, a text entry can be deemed less relevant when additional natural language content from another participant, and/or other contextual data, indicates that the text entry is less relevant. For instance, an email received by one or more participants during the meeting and/or after the meeting can be processed, with prior permission from the one or more participants, for determining whether a particular text entry is more relevant or less relevant. When other meeting content indicates there is a change in relevance of the text entry, the method 400 can return to the operation 406 for determining the degree of relevance for the text entry and/or natural language content that formed the basis for the text entry. Otherwise, when other meeting content does not indicate a change in relevance of the text entry, the method 400 can proceed from the operation 412 to the operation 402, and optionally to the operation 302, via continuation element "A," when no additional natural language content is being provided by any participants (e.g., when the meeting is over).

Figure 5:
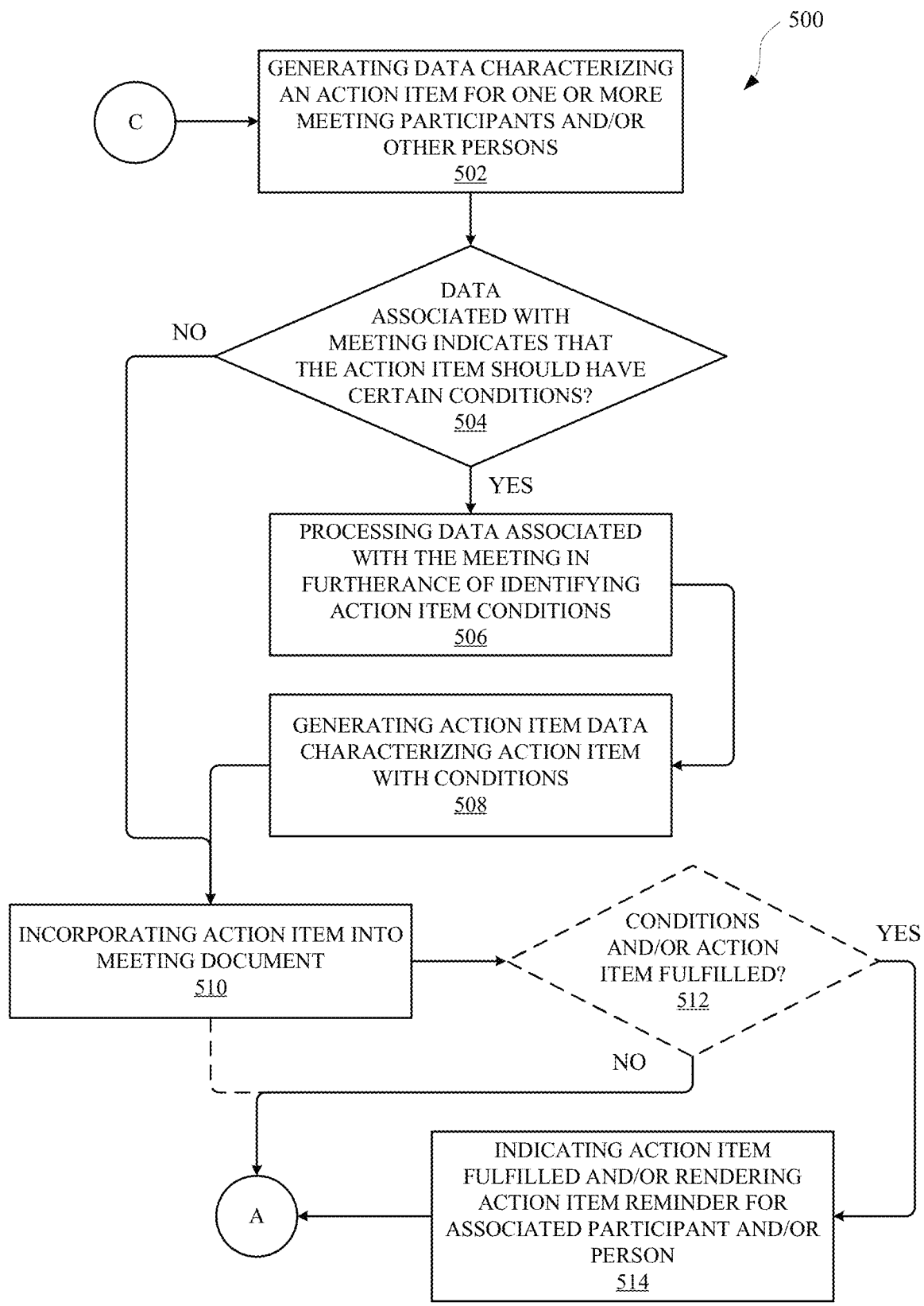
FIG. 5 illustrates a method generating an action item based on natural language content provided during a meeting of participants, and reminding certain participants about the action item and/or designating the action item as complete based on certain conditions.

FIG. 5 illustrates a method 500 for generating an action item based on natural language content provided during a meeting of participants, and reminding certain participants about the action item and/or designating the action item as complete based on certain conditions. The method 500 can be performed by one or more applications, devices, and/or any other apparatus or module capable of interacting with a participant of a meeting. The method 500 can include an operation 502 of generating data characterizing an action item for one or more meeting participants and/or other persons. In some implementations, the data that is generated can be based on natural language content and/or other data provided by one or more participants of the meeting, one or more applications associated with the meeting, and/or one or more other persons and/or devices associated with the meeting. For example, a participant of a video meeting can provide a spoken utterance such as, "Hey, let's follow up on that next month," in response to another participant providing a separate spoken utterance such as, "Can we talk about maintenance costs soon?" Audio corresponding to each spoken utterance can be processed to generate text entries, which can be further processed to generate the data that provides the basis for the action item. For instance, one or more trained machine learning models can be utilized to process the text entries and generate a summary entry from the text entries. The summary entry can be designated as an "action item," which can be then incorporated into a meeting document that is being generated and/or was generated by a meeting application and/or other application (e.g., an assistant application).

The method 500 can proceed from the operation 502 to an operation 504, which can include determining whether data associated with the meeting indicates that the action item should have certain conditions. The conditions can be utilized to render one or more reminders to one or more participants for fulfilling the action item, and/or utilized to determine whether the action item has been fulfilled (i.e., completed). For instance, a spoken utterance such as, "Let's follow up on that next month," can provide an indication that the action item should have one or more certain conditions. Alternatively, or additionally, a spoken utterance during a meeting such as, "Once you send that attachment, I'll get started on this," can provide an indication that the receipt of an "attachment" should trigger a reminder for a participant to get started on an action item. In other words, conditional statements made within content that also identifies a particular action item can indicate that the action item should be stored in association with a conditional reminder and/or a condition for fulfillment.

When data indicates that the action item should have certain conditions, the method 500 can proceed from the operation 504 to an operation 506. Otherwise, when no data indicates the action item should have certain conditions, the method 500 can proceed from the operation 504 to an operation 510 of incorporating the action item into the meeting document. The operation 506 can include processing data associated with the meeting in furtherance of identifying action item conditions. For example, content of one or more spoken utterances from one or more participants can provide a basis for establishing conditions for a particular action item. Alternatively, or additionally, contextual data associated with a meeting can provide a basis for establishing conditions for a particular action item. For instance, calendar data that correlates a series of meetings and/or reminders about a series of meetings can serve as a basis for a "due date" for an action item and/or a time to remind a participant about an action item (e.g., 24 hours before the next meeting in a series of related meetings). Alternatively, or additionally, gatherings of, and/or communications between, participants subsequent to a meeting can trigger a reminder for an action item generated based on the meeting. For instance, a first participant sending an email to a second participant can trigger a reminder for the first participant to complete an action item that may have been generated during a prior meeting in which the second participant was present.

The method 500 can proceed from the operation 506 to an operation 508 of generating action item data that characterizes the action item with conditions. The action item data can then be stored in association with one or more participants that may be tasked with completing the action item and/or otherwise associated with the action item. For example, a meeting application can communicate the action item data to another application (e.g., an automated assistant application when the meeting application is separate from an automated assistant), which can utilize the action item data for generating reminders for a participant and/or determining whether the action item was completed (with prior permission from the participant). The method 500 can proceed from the operation 508 to the operation 510 of incorporating the action item into the meeting document. In this way, the meeting document can provide a summary of relevant topics discussed during the meeting and/or a comprehensive list of action items created during the meeting. Each action item can optionally operate as an embedded link to other data that can be helpful for completing the respective action item.

The method 500 can optionally proceed from the operation 510 to an optional operation 512 of determining whether one or more conditions and/or action item has been fulfilled. When one or more conditions are determined to be fulfilled, the method 500 can proceed an operation 514 for indicating an action item was fulfilled and/or rendering an action item reminder for one or more associated participants and/or other persons. For instance, a condition of two participants subsequently meeting in person and/or via teleconference can be satisfied, and, in response, a meeting application can cause an action item reminder to be rendered at devices associated with each respective participant of the two participants. The method 500 can then optionally proceed from the operation 514, via continuation element "A," to the operation 302 of method 300, as illustrated in FIG. 3.

Figure 6:
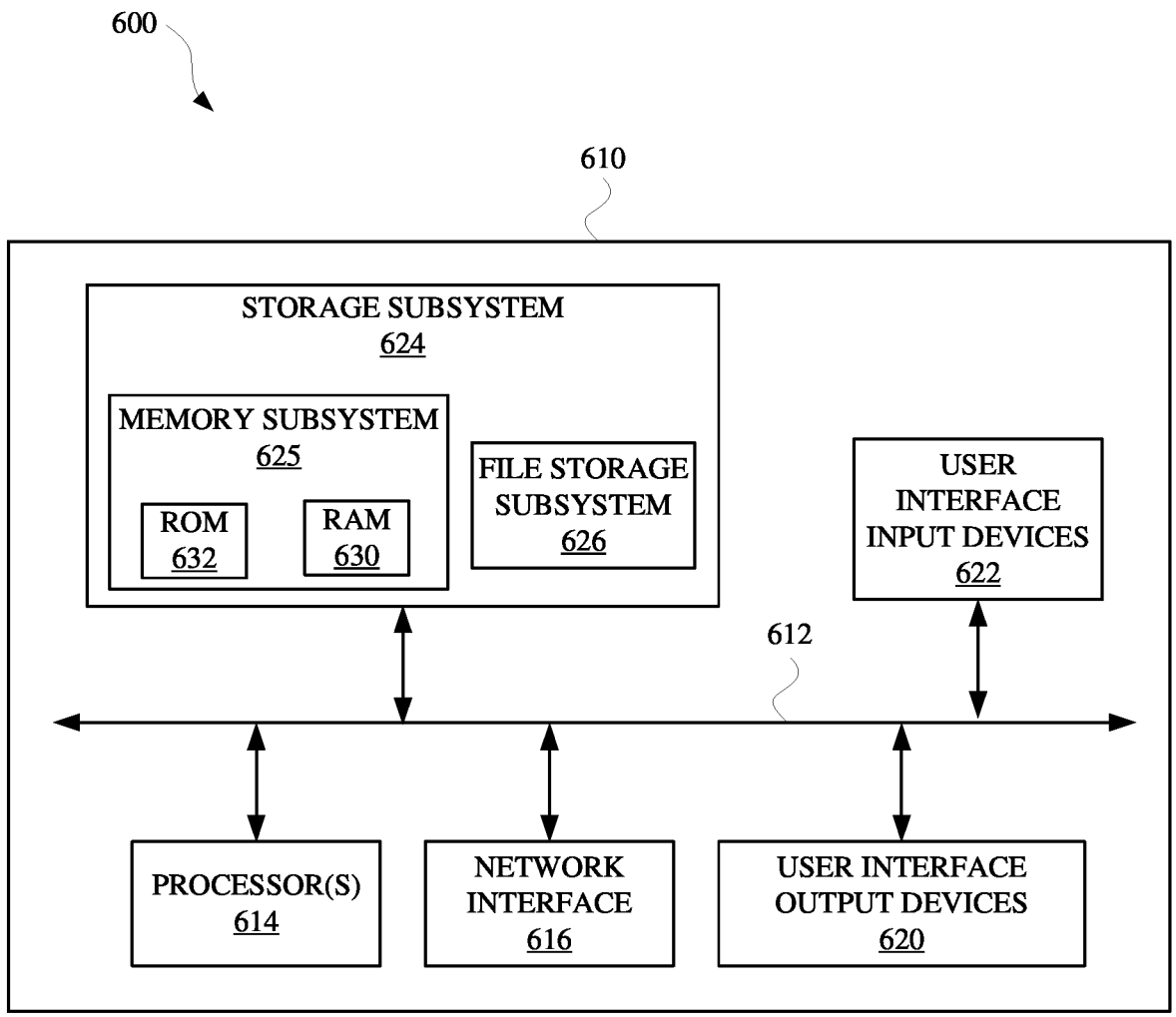
FIG. 6 illustrates an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, method 500, and/or to implement one or more of system 200, computing device 104, computing device 112, computing device 152, server device 142, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an application, that a meeting of multiple different participants is occurring, or is scheduled to occur. The meeting provides an opportunity for one or more participants of the multiple different participants to communicate information to other participants of the multiple different participants. The method can further include determining, by the application, that one or more instances of data are relevant to the meeting, at least based on the one or more instances of data including content that is determined to be associated with at least one participant of the multiple different participants. The method can further include causing, during the meeting of the multiple different participants, automatic speech recognition, performed on audio data, to be biased according to the content of the one or more instances of data. The audio data embodies speech from the one or more participants communicating the information to the other participants. The method can further include generating, by the application, an entry for a meeting document based on speech recognition results from the automatic speech recognition biased according to the content of the one or more instances of data. The entry characterizes at least a portion of the information communicated from the one or more participants to the other participants.

These and other implementations of the technology disclosed herein can optionally include one or more of the following features.

In some implementations, determining that the one or more instances of data are relevant to the meeting includes: determining that the one or more instances of data include a document that has been accessed and/or edited by at least one participant of the multiple different participants prior to the meeting. In some implementations, determining that the one or more instances of data are relevant to the meeting additionally or alternatively includes: determining that the one or more instances of data include a document that has been accessed and/or edited by at least one participant of the multiple different participants within a threshold duration of time prior to the meeting. In some implementations, determining that the one or more instances of data are relevant to the meeting additionally or alternatively includes: determining that the one or more instances of data include a document that is being accessed and/or edited by at least one participant of the multiple different participants during the meeting. In some implementations, determining that the one or more instances of data are relevant to the meeting additionally or alternatively includes: determining that the one or more instances of data include a document that embodies one or more terms identified in a meeting invitation for the meeting, and that is accessible to at least one participant of the multiple different participants.

In some implementations, determining that the one or more instances of data are relevant to the meeting includes: determining that the one or more instances of data include a document that embodies one or more terms identified in a title of a meeting invitation for the meeting.

In some implementations, causing the automatic speech recognition to be biased according to the content of the one or more instances of data includes: generating, based on a portion of the audio data, one or more candidate terms for including with the entry in the meeting document; and assigning a weight value to each term of the one or more candidate terms. Each weight value is at least partially based on whether a particular term of the one or more candidate terms is included in the content of the one or more instances of data. I In some implementations, determining that one or more instances of data are relevant to the meeting includes: determining that one or more documents, comprising the content, were accessed by at least one participant of the multiple different participants within a threshold duration of time before the meeting. In some of those implementations, the threshold duration of time is based on when a meeting invitation was received and/or accessed by at least one participant who accessed the document. In some implementations, determining that the one or more instances of data are relevant to the meeting additionally or alternatively includes: selecting one or more terms from the one or more documents as content that provides a basis for biasing the automatic speech recognition. The one or more terms can be selected based on an inverse document frequency of the one or more terms appearing in the one or more documents.

In some implementations, a method implemented by one or more processors is set forth as including operations such as causing, by an application of a computing device, audio data corresponding to spoken natural language content to be processed in furtherance of generating a text entry for a meeting document. The spoken natural language content is provided by a participant of a meeting to one or more other participants of the meeting. The method can further include determining, based on the text entry, a degree of relevance of the text entry to one or more instances of data associated with the meeting. The one or more instances of data include a document accessed by at least one participant of the meeting prior to, and/or during, the meeting. The method can further include determining, based on the degree of relevance, whether or not to incorporate the text entry into the meeting document. The method can further include, when the application determines to incorporate the text entry into the meeting document: causing, by the application, the text entry to be incorporated into the meeting document, wherein the meeting document is being rendered at a display interface of the computing device, or an additional computing device, that is being accessed, during the meeting, by the one or more other participants of the meeting.

These and other implementations of the technology disclosed herein can optionally include one or more of the following features.

In some implementations, the method can further include, when the application determines to incorporate the text entry into the meeting document: determining that, during the meeting, a particular participant of the meeting selected, via an interface of the computing device, or the other computing device, to generate an action item based on the text entry of the meeting document. The action item is generated to provide a conditional reminder to at least one participant of the meeting. In some implementations, the conditional reminder is rendered for the at least one participant of the meeting when one or more conditions are satisfied. The one or more conditions can be determined to be satisfied using at least contextual data that is accessible to the application. For example, the contextual data can include a location of the at least one participant of the meeting, and the one or more conditions can be satisfied when the at least one participant of the meeting is within a threshold distance of a particular location.

In some implementations, determining the degree of relevance of the text entry to the one or more instances of data associated with the meeting includes: determining that a first participant of the meeting provided, during the meeting, a text input to a first document, and that a second participant of the meeting provided, during the meeting, an additional text input to a second document. In some of those implementations, the degree of relevance is based on whether or not the text input and the additional text input are correlated to the text entry generated from the spoken natural language input. In some implementations, determining the degree of relevance of the text entry to the one or more instances of data associated with the meeting additionally or alternatively includes: determining that a first participant of the meeting provided a spoken input during the meeting, and that a second participant of the meeting provided an additional spoken input within a threshold duration of time of the participant providing the spoken natural language content. In some of those implementations, the degree of relevance is based on whether or not the spoken input and the additional spoken input are correlated to the text entry. In some implementations, determining the degree of relevance of the text entry to the one or more instances of data associated with the meeting additionally or alternatively includes: determining that the at least one participant of the meeting performed a non-verbal gesture when the participant of the meeting provided the spoken natural language content. In some of those implementations, the degree of relevance is based on an interpretation of the non-verbal gesture by the application or another application.

In some implementations, a method implemented by one or more processors is set forth as including operations such as determining, by an application, that a participant of a meeting has provided natural language content to a computing device that is accessible during the meeting. The application is accessible via the computing device, and the meeting includes one or more other participants. The method can further include causing, in response to determining the participant provided the natural language content, input data to be processed in furtherance of generating a text entry for a meeting document. The input data is captured by an interface of the computing device and characterizes the natural language content provided by the participant. The method can further include determining, based on processing the input data, whether to incorporate the text entry into the meeting document as an action item to be completed by at least one participant of the meeting. Determining whether to incorporate the text entry as the action item is at least partially based on whether the natural language content embodies a request for the at least one participant and/or the application. The method can further include, when the application determines to incorporate the text entry into the meeting document as an action item: causing, by the application, the action item to be incorporated into the meeting document. The meeting document is accessible via a display interface of the computing device, or another computing device, that is being accessed, during the meeting, by the one or more other participants of the meeting.

These and other implementations of the technology disclosed herein can optionally include one or more of the following features.

In some implementations, the method can further include, when the application determines to not incorporate the text entry into the meeting document the action item: causing the text entry to be incorporated into the meeting document as a transcription of the natural language content provided by the participant of the meeting. In some implementations, the method can further include, when the application determines to incorporate the text entry into the meeting document as an action item: causing, by the application, a conditional reminder to be rendered for the at least one participant when one or more conditions are satisfied, where the one or more conditions are determined to be satisfied using at least contextual data that is accessible to the application.

We claim:

1. A method implemented by one or more processors, the method comprising:
   determining, at a computing device and by an application, that a meeting of multiple different participants is occurring, or is scheduled to occur,
      wherein the meeting provides an opportunity for one or more participants of the multiple different participants to communicate information to other participants of the multiple different participants;
   determining, by the application, that one or more instances of data are relevant to the meeting, at least based on the one or more instances of data comprising content that is determined to be associated with at least one participant of the multiple different participants,
      wherein determining that one or more instances of data are relevant to the meeting includes:
         determining that one or more documents, comprising the content, were accessed by at least one participant of the multiple different participants within a threshold duration of time before the meeting;
   causing, during the meeting of the multiple different participants, automatic speech recognition, performed on audio data, to be biased according to the content of the one or more instances of data, including causing the automatic speech recognition to be biased according to the content of the one or more documents determined to be accessed by the at least one participant within the threshold duration of time before the meeting,
      wherein the audio data embodies speech from the one or more participants communicating the information to the other participants; and
   generating, by the application, an entry for a meeting document based on speech recognition results from the automatic speech recognition biased according to the content of the one or more instances of data,
      wherein the entry characterizes at least a portion of the information communicated from the one or more participants to the other participants.

2. The method of claim 1, wherein determining that the one or more instances of data are relevant to the meeting further includes:
   determining that the one or more instances of data include a document that has edited by at least one participant of the multiple different participants prior to the meeting.

3. The method of claim 1, wherein determining that the one or more instances of data are relevant to the meeting further includes:
   determining that the one or more instances of data include a document that has edited by at least one participant of the multiple different participants within the threshold duration of time prior to the meeting.

4. The method of claim 1, wherein determining that the one or more instances of data are relevant to the meeting further includes:
   determining that the one or more instances of data include a document that is being accessed and/or edited by at least one participant of the multiple different participants during the meeting.

5. The method of claim 1, wherein determining that the one or more instances of data are relevant to the meeting further includes:
   determining that the one or more instances of data include a document that embodies one or more terms identified in a meeting invitation for the meeting, and that is accessible to at least one participant of the multiple different participants.

6. The method of claim 1, wherein determining that the one or more instances of data are relevant to the meeting further includes:
   determining that the one or more instances of data include a document that embodies one or more terms identified in a title of a meeting invitation for the meeting.

7. The method of claim 1, wherein causing the automatic speech recognition to be biased according to the content of the one or more instances of data includes:
generating, based on a portion of the audio data, one or more candidate terms for including with the entry in the meeting document; and
assigning a weight value to each term of the one or more candidate terms,
wherein each weight value is at least partially based on whether a particular term of the one or more candidate terms is included in the content of the one or more instances of data.

8. The method of claim 1, wherein the threshold duration of time is determined based on when a meeting invitation was received and/or accessed by at least one participant who accessed the one or more documents.

9. The method of claim 1, wherein determining that the one or more instances of data are relevant to the meeting further includes:
selecting one or more terms from the one or more documents as content that provides a basis for biasing the automatic speech recognition,
wherein the one or more terms are selected based on an inverse document frequency of the one or more terms appearing in the one or more documents.

10. A system comprising:
memory storing instructions;
one or more processors operable to execute the instructions to:
method implemented by one or more processors, the method comprising:
determine that a meeting of multiple different participants is occurring, or is scheduled to occur,
wherein the meeting provides an opportunity for one or more participants of the multiple different participants to communicate information to other participants of the multiple different participants;
determine that one or more instances of data are relevant to the meeting, at least based on the one or more instances of data comprising content that is determined to be associated with at least one participant of the multiple different participants, wherein in determining that one or more instances of data are relevant to the meeting one or more of the processors are to:
determine that one or more documents were accessed by at least one participant of the multiple different participants within a threshold duration of time before the meeting;
cause, during the meeting of the multiple different participants, automatic speech recognition, performed on audio data, to be biased according to the content of the one or more instances of data, including to cause the automatic speech recognition to be biased according to the content of the one or more documents determined to be accessed by the at least one participant within the threshold duration of time before the meeting,
wherein the audio data embodies speech from the one or more participants communicating the information to the other participants; and
generate an entry for a meeting document based on speech recognition results from the automatic speech recognition biased according to the content of the one or more instances of data,
wherein the entry characterizes at least a portion of the information communicated from the one or more participants to the other participants.

11. The system of claim 10, wherein in determining that the one or more instances of data are relevant to the meeting one or more of the processors are further to:
determine that the one or more instances of data include a document that has been edited by at least one participant of the multiple different participants prior to the meeting.

12. The system of claim 10, wherein in determining that the one or more instances of data are relevant to the meeting one or more of the processors are further to:
determine that the one or more instances of data include a document that has edited by at least one participant of the multiple different participants within a threshold duration of time prior to the meeting.

13. The system of claim 10, wherein in determining that the one or more instances of data are relevant to the meeting one or more of the processors are further to:
determine that the one or more instances of data include a document that is being accessed and/or edited by at least one participant of the multiple different participants during the meeting.

14. The system of claim 10, wherein in determining that the one or more instances of data are relevant to the meeting one or more of the processors are further to:
determine that the one or more instances of data include a document that embodies one or more terms identified in a meeting invitation for the meeting, and that is accessible to at least one participant of the multiple different participants.

15. The system of claim 10, wherein in determining that the one or more instances of data are relevant to the meeting one or more of the processors are further to:
determine that the one or more instances of data include a document that embodies one or more terms identified in a title of a meeting invitation for the meeting.

16. The system of claim 10, wherein in causing the automatic speech recognition to be biased according to the content of the one or more instances of data one or more of the processors are to:
generate, based on a portion of the audio data, one or more candidate terms for including with the entry in the meeting document; and
assign a weight value to each term of the one or more candidate terms,
wherein each weight value is at least partially based on whether a particular term of the one or more candidate terms is included in the content of the one or more instances of data.

17. The system of claim 10, wherein the threshold duration of time is determined based on when a meeting invitation was accessed by at least one participant who accessed the one or more documents.

18. The system of claim 10, wherein in determining that the one or more instances of data are relevant to the meeting one or more of the processors are further to:
select one or more terms from the one or more documents as content that provides a basis for biasing the automatic speech recognition,
wherein the one or more terms are selected based on an inverse document frequency of the one or more terms appearing in the one or more documents.

\* \* \* \* \*